No. 893,006. PATENTED JULY 14, 1908.
E. MONTI.
APPARATUS FOR CONCENTRATING SOLUTIONS.
APPLICATION FILED SEPT. 9, 1904.
3 SHEETS—SHEET 2.
Fig. 3.
Fig. 2.
ON LINE 2-2
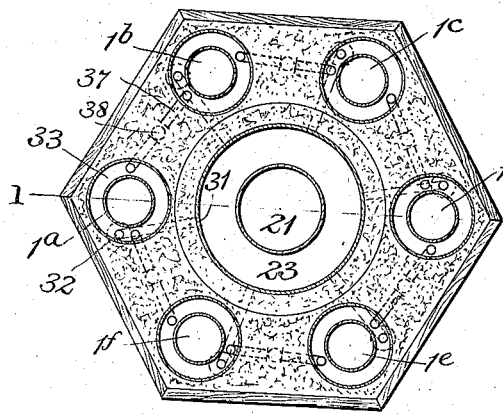
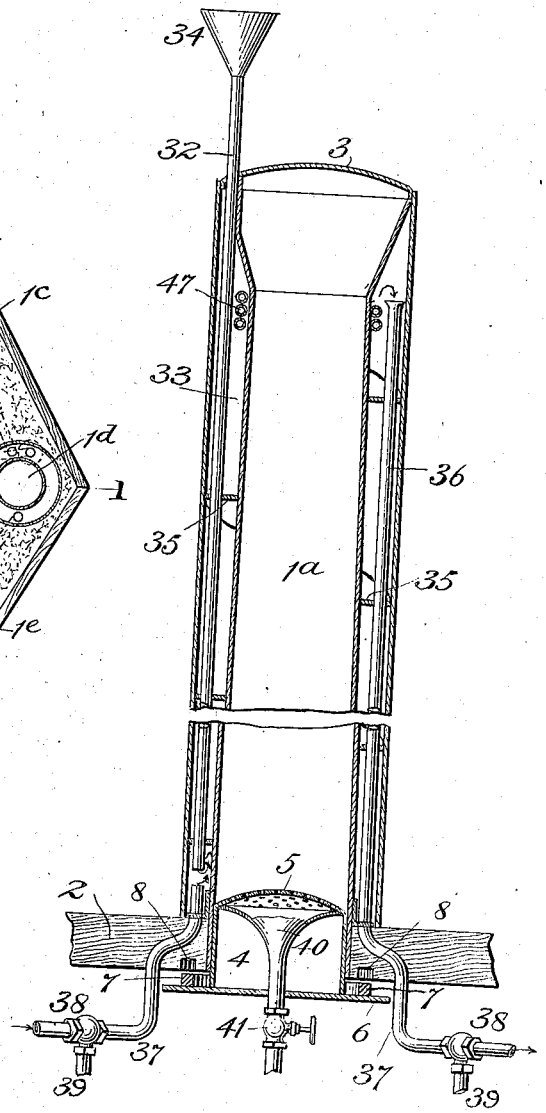
Witnesses
Inventor
Eudo Monti
By Knight Bros
Attorneys

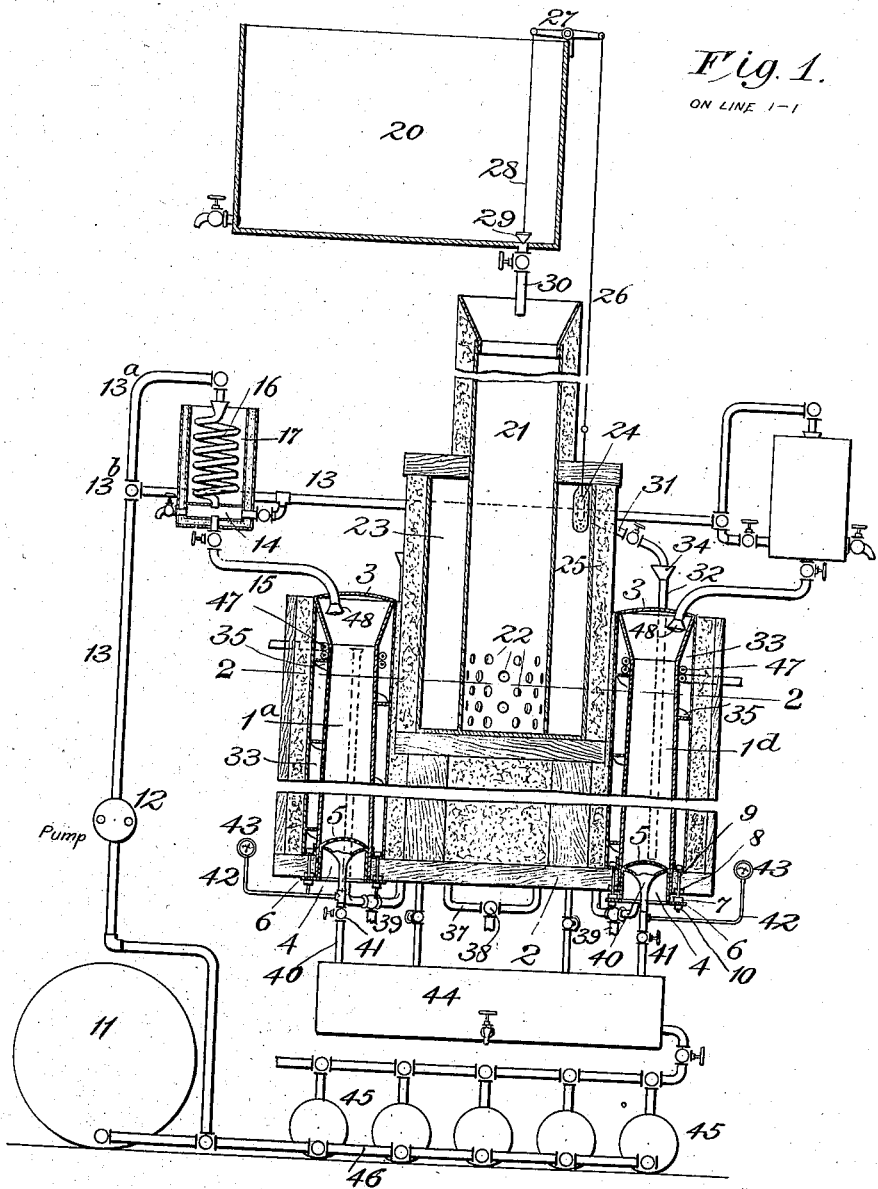

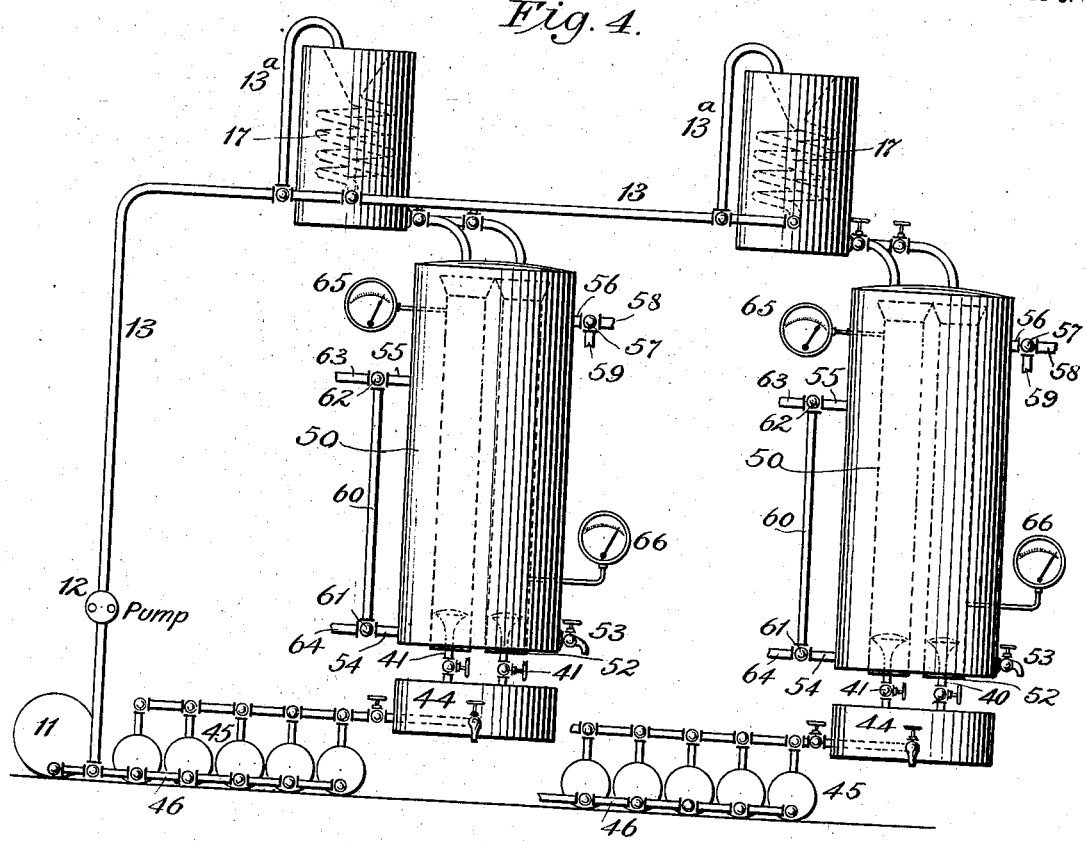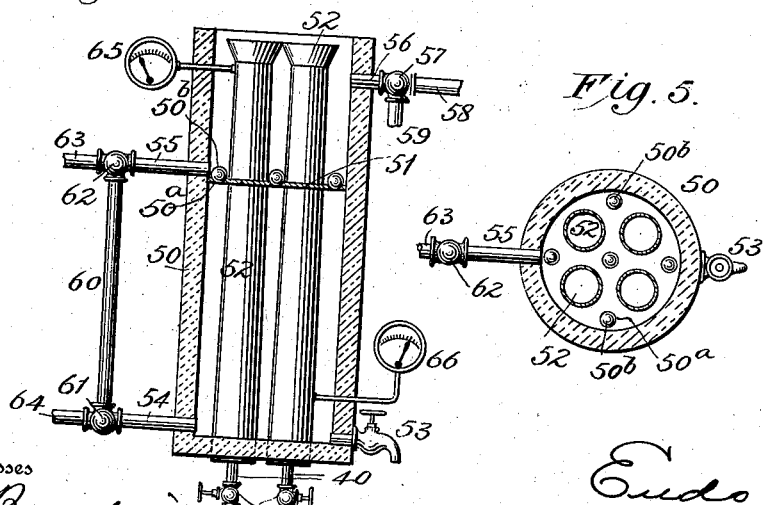

UNITED STATES PATENT OFFICE.

EUDO MONTI, OF TURIN, ITALY.

APPARATUS FOR CONCENTRATING SOLUTIONS.

No. 893,006.

Specification of Letters Patent.

Patented July 14, 1908.

Application filed September 9, 1904. Serial No. 223,919.

*To all whom it may concern:*

Be it known that I, EUDO MONTI, a subject of the King of Italy, and resident of Turin, Italy, have invented certain new and useful Improvements in Apparatus for Concentrating Solutions, of which the following is a specification.

The invention relates to apparatuses for concentrating solutions and more particularly to an apparatus for carrying out the process described in my patent #761,387 dated May 31, 1904 in which the solutions, (any kind of animal, vegetable extracts or minerals solutions such as sugar beet, meat coffee, tea etc.) are frozen and the soluble matters are displaced from the ice.

An object of the present invention is to provide a suitable apparatus of the type above described by which the said process may be carried out with the least possible consumption of power and of labor, rendering it considerably cheaper than concentration in vacuum.

Another object is to provide an apparatus to concentrate solutions when ice or refrigerating machines are not at hand, but ice or snow and fuel are plentiful.

Other and further objects will appear in the following description and will be more particularly pointed out in the appended claims, reference being had to drawings forming a part hereof, in which Figure 1 is a view of one embodiment of my invention showing a section on the line 1—1, Fig. 2 and the remainder of the apparatus diagrammatically; Fig. 2 is a horizontal section on the line 2—2, Fig. 1; Fig. 3 is a vertical section through one of the freezing tanks; Fig. 4 is a diagrammatic view of another embodiment of my invention; Fig. 5 is a horizontal section through one of the freezing tanks of this embodiment, and Fig. 6 is a vertical section of the said tank.

In carrying out the process in an ordinary ice or refrigerating mold or tank found in any ice factory, as described in my patent above referred to, I have ascertained that the frozen solution cannot be removed from the molds without melting some of the ice crystals. Also it is impossible to disintegrate the frozen material without exposing it and the interposed solution to the action of the air. I avoid such disadvantages and save considerable labor by displacing the concentrated material from the frozen material while it is within the tank in which it is frozen. In the embodiment shown in Figs. 1 to 3, an annular series of freezing or refrigerating tanks $1^a$, $1^b$, $1^c$, $1^d$, $1^e$ and $1^f$ is mounted on a frame 2 and suitably insulated from one another. These tanks preferably taper from their bottoms upwardly, and have their upper ends closed by covers 3 and their lower ends closed by removable bottoms 4. Each bottom is of cylindrical form and fits within the lower end of a tank. Its upper end is covered by a convex and perforated grate 5, while its lower end is provided with an outwardly extending flange 6 which carries an annular packing ring 7 adapted to enter an annular groove 8 in the bottom of the frame surrounding a refrigerating or freezing tank. The bottom is held in place by means of bolts 9 which extend through the frame 2 and have removable nuts 10 at their lower ends. Within the cylindrical part of the bottom is a drain pipe 40 flared at its upper end and carrying a cock 41 and a pipe 42 which leads to a thermometer 43.

The solution to be concentrated is contained in a receptacle 11 and is fed by means of a pump 12 through piping 13 and $13^a$ either to the lower chamber 14 or to cooling coil 16 of cooling tanks which are disposed above the freezing tanks and are connected therewith by means of piping 15. Each cooling tank consists of a lower compartment 14 connected to piping 13 and a cooling coil positioned within an upper refrigerant receptacle 17, leading at its lower end into the lower compartment and having its upper end connected to piping $13^a$ which is branched from piping 13 and controlled by valve $13^b$.

The refrigerant, such as brine or acidiferous solution (sulfuric acid at 42 B) previously cooled as much as possible, is contained within a supply receptacle 20 which delivers through pipe 30 into an ice receptacle 21 centrally positioned on the frame 2 within the annular series of freezing tanks, and in an elevated position. This ice receptacle is perforated at 22 at its lower end and is positioned centrally within a refrigerant cooling receptacle 23. Located within the receptacle 23 near its upper end is a float 24 which is surrounded by a perforated protecting casing 25 and is connected by a rod 26, through pivoted lever 27 and rod 28, with a valve 29 automatically controlling the flow from receptacle 20 to ice receptacle 21 through pipe 30.

The refrigerating material or refrigerant from the central refrigerant receptacle 23 is delivered through flexible pipes 31 leading therefrom above the freezing tanks, to the vertical pipes 32 each positioned within a refrigerant compartment 33 surrounding a freezing tank. Each vertical pipe is provided with a funnel 34 at its upper end and has its lower end positioned above the bottom of the refrigerant compartment 33. As the refrigerant leaves the lower end of the vertical pipe it travels upwardly in a spiral direction around the freezing tank, due to the arrangement of a screw 35 within the refrigerant compartment 33. Also positioned in each refrigerant compartment is an overflow pipe 36, the upper end of which is positioned below the top of said compartment, while its lower end is connected by means of piping 37 with the adjacent refrigerant compartment. Within the piping 37 is positioned a valve 38 by which the overflow material may be directed through waste pipe 39 instead of to the adjacent refrigerant compartment.

The operation is as follows: The freezing tanks 1$^a$, 1$^b$, etc., are about three quarters filled from the receptacle 11 with the material to be concentrated, by means of pump 12 which delivers the same into a lower compartment 14 of the cooling tanks, from which it is delivered into tanks 1$^a$, 1$^b$, etc. The refrigerant passes from supply receptacle 20 to its cooling receptacle 23 and through the means of float 24 said receptacle is always maintained full. From the cooling receptacle 23, the refrigerant is delivered into one of the vertical pipes 32 from which it passes upwardly in a spiral direction around the freezing tank until it reaches the upper end of overflow pipe 36, when it descends through the latter into the piping 37 into the lower part of the next refrigerant compartment and upwardly in a spiral direction through the same until it reaches the latter's overflow pipe and so on until it has completely interchanged its temperature with that of the solution in the several freezing tanks; after which the valve 38 of the last tank is turned to direct the refrigerant through a waste pipe 39.

When the solution within the first mold or tank has been cooled or frozen to the desired temperature, which may be ascertained through the thermometer 43, the valve of the flexible pipe 31 is closed, the one over the funneled upper end of the next vertical pipe 32 is opened and the first freezing tank is cut out of the circuit; and this is continued until the material in every freezing tank has been frozen. While the freezing is going on the soluble condensed material is displaced from among the ice crystals of the tanks containing the frozen materials. This is accomplished by opening cock 41 and permitting the most condensed matters to drain off into a collecting receptacle 44 below. From this receptacle the material is conducted, if desired, to another freezing tank for reconcentration or to one of the storage receptacles 45. After the most condensed matter has been drained off, the upper part of the freezing tank is heated by a coil 47 in which warm water is circulated causing the melting of the ice and the displacement of gradually more and more dilute solutions which are conducted to the several storage receptacles 45 and are employed for displacing matter held within the ice crystals of future operations. For this purpose storage receptacles 45 are connected by piping 46 with the pump 12 or a cylinder full of compressed or liquefied gas and the gradually more and more dilute solutions are conducted through the coils 16 of the cooling tanks to reduce their temperature approximately to the freezing point of the ice within the freezing tank. From the cooling tanks the cooled gradually more and more dilute solutions are conducted through piping 15 to the freezing tanks or molds, being sprayed over the upper surface of the ice therein by means of a sprayer 48 which preferably plays upon a cloth laid on the ice to insure the uniform distribution of the displacing fluid. The reconcentration is carried on in exactly the same way except that the concentrated solution must be cooled to a lower temperature.

The embodiment shown in Figs. 1 to 3 is adapted for concentrating small quantities of solutions of considerable value and is much cheaper than an apparatus requiring a small ice or refrigerating machine, as the ice from previous concentrations may be used in the ice receptacle 21 and the cooling tanks. When sulfuric acid is employed as the refrigerant, the waste may be utilized as a fertilizer.

The embodiment illustrated in Figs. 4 to 6 is adapted for use with an ice or refrigerating machine supplying a refrigerant (such as brine) in a continuous stream. The manner of supplying the solution to and removing it from the freezing tank is the same as shown in the first-described embodiment.

An insulated refrigerant chamber 50 divided into an upper and a lower compartment by a partition 51, contains a number of freezing tanks or molds 52 which are provided with removable bottoms similar to those of the other embodiment. The lower compartment of the refrigerant chamber 50 communicates with the upper compartments through ports 50$^a$ controlled by downwardly seating ball valves 50$^b$, and is provided with a waste cock 53, and an inlet pipe 54, both of which are at the lower part thereof. The upper compartment is provided with a pipe 55 at the lower part thereof and a waste pipe 56 near the top, the waste pipe being provided with a valve 57 to direct material either to pipe 58 or to pipe 59. The inlet pipe 54 of the lower compartment is connected to the pipe 55 of the upper compartment by a pipe 60, and valves 61 and 62 control the direction of the flows through these pipes, a refrigerant pipe 63 being connected with valve 62. Thermometers 65 and 66 respectively show the temperature in the upper and the lower compartments of the refrigerant chamber 50.

After the solution to be concentrated has been placed within the freezing tanks 52, in the manner set forth relative to the other embodiment, valves 61 and 62 are turned to direct the refrigerant, such as brine, from the pipe 63, through both inlet pipes 54 and 55 into both compartments of the refrigerant chamber 50. When the crystallization of the material to be removed from the solution, has taken place, and the most concentrated matter has been drained off in the manner before stated, the waste cock 53 is turned to discharge the refrigerant in the lower compartment and valves 61 and 62 are turned to direct the refrigerant in the upper compartment to the lower compartment. When the upper compartment is empty valve 61 is turned to connect inlet pipe 60 with warm water pipe 64 and a flow of warm water is established through the upper chamber and out through waste pipe 56, thereby heating the upper ends of the freezing tanks and causing the upper part of the crystallized mass to be melted and to displace the concentrated matter in the lower part of the crystallized mass. The operation is then carried on as set forth with relation to the other embodiment.

Having thus described my invention what I claim as new therein and desire to secure by Letters Patent is:

1. In an apparatus of the class described, the combination with a tank, of means for producing a freezing action throughout the length of the tank, means for draining the tank, a removable bottom for the tank, a cooling coil, a series of storage vessels having connection with the cooling coil, a pump for forcing material from the storage tank to the cooling coil, and connection between the cooling means and the freezing tank.

2. In an apparatus of the class described, the combination with a tank, of means for producing a freezing action in the tank, and a removable bottom for the tank comprising a drain pipe flared at its upper end, a grate over the flared upper end, and a cock in the drain pipe.

3. In an apparatus of the class described, the combination with the freezing tank, of a frame supporting the same and having a groove surrounding the lower end of the tank, a bottom removably fitted within the tank, a grate at its upper end, an outwardly extending flange at the lower end of the bottom, a packing supported on the flange and adapted to enter the groove in the frame, and a drain pipe having a cock, carried by the bottom.

4. In an apparatus of the class described, the combination of the freezing tank, means for cooling the tank, means for draining the tank, means for heating the upper portion of the freezing tank without heating the bottom thereof, a series of storage vessels, having connection with the draining means, a cooling coil, communication between the storage tank and the cooling coil and communication between the cooling coil and the freezing tank.

5. In an apparatus of the class described, the combination of the freezing tank, means for cooling the same, means for draining the tank, a series of storage vessels having connection with the draining means, a cooling coil, communication between the cooling coil and the storage vessels, and communication between the freezing tank and the cooling coil.

6. In an apparatus of the class described, the combination of the freezing tank, means for cooling the same, means for draining the tank, a series of storage vessels having connection with the draining means, a cooling coil, communication between the cooling coil and the storage vessel, communication between the freezing tank and the cooling coil, and means for heating the freezing tank.

7. In an apparatus of the class described, the combination with the refrigerant compartment, of the freezing tank positioned within the same, means for draining the freezing tank, a spiral or screw surrounding the freezing tank and causing the refrigerant to take a spiral course, and means for delivering a refrigerant to the lower end of the spiral.

8. In an apparatus of the class described, the combination with the annular series of refrigerant compartments, of the freezing tanks positioned in the same, a vertical pipe positioned in each refrigerant compartment, having a funnel at its upper end and discharging into the compartment at its lower end, an overflow pipe positioned in each of said compartments, and connection between the lower end of the adjacent compartment and the overflow pipe.

9. In an apparatus of the class described, the combination with the annular series of refrigerant compartments, of the freezing tanks positioned in the same, a vertical pipe positioned in each refrigerant compartment, having a funnel at its upper end and discharging into the compartment at its lower end, an overflow pipe positioned in each of said compartments, connection between the lower end of the adjacent compartment and the overflow pipe, and a discharge in said connections.

10. In an apparatus of the class described, the combination with the annular series of refrigerant compartments, of the freezing tanks positioned in the same, a vertical pipe positioned in each refrigerant compartment, having a funnel at its upper end and discharging into the compartment at its lower end, an overflow pipe positioned in each of said compartments, connection between the lower end of the adjacent compartment and the overflow pipe, a discharge in said connections and a spiral or screw within each compartment and surrounding the freezing tank therein, causing the refrigerant to travel upwardly in a spiral direction.

11. The combination with the freezing tank, of a series of storage vessels or compartments, having connection with said freezing tank, a cooling tank, connection between the cooling tank and the freezing tank, and means for forcing material from the storage vessel to the cooling tank.

The foregoing specification signed at Turin, Piedmont, Italy, this 20th day of October, 1905.

EUDO MONTI.

In presence of two witnesses—
　GOTTARDO C. PIRONI,
　C. ZIACTZETTI.